(12) United States Patent
Saito et al.

(10) Patent No.: US 12,366,212 B2
(45) Date of Patent: Jul. 22, 2025

(54) THROTTLE DEVICE

(71) Applicant: HITACHI ASTEMO, LTD., Hitachinaka (JP)

(72) Inventors: Takumi Saito, Hitachinaka (JP); Daisuke Shiraida, Hitachinaka (JP); Ryuichi Yaegashi, Hitachinaka (JP)

(73) Assignee: Hitachi Astemo, Ltd., Ibaraki (JP)

( * ) Notice: Subject to any disclaimer, the term of this patent is extended or adjusted under 35 U.S.C. 154(b) by 14 days.

(21) Appl. No.: 18/431,065

(22) Filed: Feb. 2, 2024

(65) Prior Publication Data

US 2024/0263591 A1 Aug. 8, 2024

(30) Foreign Application Priority Data

Feb. 8, 2023 (JP) ................................. 2023-017746

(51) Int. Cl.
*F02D 9/10* (2006.01)
*F16K 27/02* (2006.01)
*F16K 31/04* (2006.01)

(52) U.S. Cl.
CPC ......... *F02D 9/1095* (2013.01); *F02D 9/1035* (2013.01); *F02D 9/1065* (2013.01); *F16K 27/0218* (2013.01); *F16K 31/047* (2013.01)

(58) Field of Classification Search
CPC .... F02D 9/1095; F02D 9/1035; F02D 9/1065; F16K 27/0218; F16K 31/047; F16K 1/221
See application file for complete search history.

(56) References Cited

U.S. PATENT DOCUMENTS

| | | | | |
|---|---|---|---|---|
| 2013/0133617 A1* | 5/2013 | Machida | ................. | F02D 9/109 |
| | | | | 123/336 |
| 2016/0160763 A1* | 6/2016 | Matsuda | ................ | B62K 11/04 |
| | | | | 123/403 |
| 2019/0026408 A1* | 1/2019 | Yamaumi | ................. | G06N 7/01 |
| 2020/0063654 A1* | 2/2020 | Kontani | ................ | F02D 9/1095 |
| 2022/0325670 A1* | 10/2022 | Komoto | ................. | F02D 9/107 |
| 2023/0265801 A1* | 8/2023 | Kiku | ..................... | F02D 9/1065 |
| | | | | 123/336 |
| 2023/0313745 A1* | 10/2023 | Nakano | ................... | F02D 41/08 |
| | | | | 123/336 |

FOREIGN PATENT DOCUMENTS

| | | |
|---|---|---|
| EP | 1 548 252 A1 | 6/2005 |
| JP | 2015-083809 A | 4/2015 |
| WO | 2004/025103 A1 | 3/2004 |

* cited by examiner

*Primary Examiner* — Kelsey E Cary
(74) *Attorney, Agent, or Firm* — Carrier, Shende & Associated P.C.; Joseph P. Carrier; Fulchand P. Shende (57) ABSTRACT

Provided is a throttle device including two throttle bodies having motors that face to each other, in which the wiring base member is compactly placed. A throttle device 1 includes first and second throttle bodies 2 and 3. The first and second throttle bodies 2 and 3 each include a gear case 10 that houses a deceleration mechanism 9 that transmits the rotational force of the motor 8 to the throttle shaft 6. A wiring base member 7 having a power coupler 14 is fixed between the first and second throttle bodies 2 and 3 while being placed between these gear cases 10. The wiring base member 7 has wiring 32 embedded therein, the wiring 32 connecting the motor terminal 25 of each motor 8, the motor terminal 25 protruding into the gear case 10, and the power coupler 14.

5 Claims, 7 Drawing Sheets

THROTTLE DEVICE

BACKGROUND OF THE INVENTION

1. Field of the Invention

The present invention relates to a throttle device that includes first and second throttle bodies that are fixed to each other.

2. Description of the Related Art

Conventionally known throttle devices include a first throttle body and a second throttle body that each include a throttle shaft, a motor, and a deceleration mechanism that decelerates and transmits the rotation of the motor to the throttle shaft. These throttle devices are configured so as to control the opening degree of the valve element supported by the throttle shaft independently for each throttle body (see, for example, WO 2004025103 A1).

In the throttle device of WO 2004025103 A1, the deceleration mechanisms and motors of the first and second throttle bodies are placed to face each other in the region between the adjacent intake passages of the first throttle body and the second throttle body, and these throttle bodies are coupled at a place near the deceleration mechanisms.

WO 2004025103 A1 does not disclose the wiring to the motors. Typically a wiring base member for wiring to a motor is configured so that a lead frame connecting the motor and the power coupler terminals is embedded in a resin molding, as described in JP 2015-83809 A. The wiring base member is fixed to the throttle body with bolts, with its lead frame connected to the terminals of the motor.

SUMMARY OF THE INVENTION

If the wiring base member described in JP 2015-83809 A is used to the throttle device described in WO 2004025103 A1 in which a motor is placed in each of the two throttle bodies, the wiring base member corresponding to each motor will be fixed to each throttle body with bolts. In this case, installation space for these wiring base member and bolts is required for each throttle body, which increases the size of the device.

In view of the problems of the conventional techniques, the present invention aims to provide a throttle device including two throttle bodies having motors that face to each other, in which the wiring base member is compactly placed.

(1) A throttle device of the present invention includes first and second throttle bodies that are fixed to each other.

Each throttle body includes an intake passage, a valve element that opens and closes the intake passage, a throttle shaft that holds the valve element and is rotatably supported by the throttle body, a motor having a drive shaft substantially parallel to the throttle shaft, a deceleration mechanism that decelerates and transmits a rotational force of the drive shaft at the shaft end to the throttle shaft, and a gear case that houses the deceleration mechanism.

Each gear case is open at the shaft end in a direction along the drive shaft so that the shaft ends of the drive shafts face each other.

The throttle device further includes: a wiring base member that has a double-sided cover face that covers opening sides of the gear cases; and an outer periphery that constitutes an outer edge of the cover face, the wiring base member being disposed between the gear cases to be fixed between the first and second throttle bodies, the wiring base member having a power coupler on the outer periphery.

Each motor includes a motor terminal protruding into the corresponding gear case.

The wiring base member has wiring embedded therein, the wiring connecting the motor terminal of each motor and the power coupler.

In the present invention, the wiring base member is fixed between the first and second throttle bodies while being placed between their gear cases, and the wiring base member has wiring embedded therein, the wiring connecting the motor terminal of each motor and the power coupler of the wiring base member.

This reduces or eliminates dedicated fixing members such as bolts, which are used only to separately fix two wiring base members to the first and second throttle bodies.

Thus, the present invention provides a throttle device including two throttle bodies having motors that face to each other, in which the wiring base member is compactly placed. This enables downsizing of the throttle device and also reduction in the weight and cost.

(2) In the present invention, each gear case may have a fastening hole that receives an inserted bolt that fastens the gear cases together, the wiring base member may have an insertion hole that receives the inserted bolt, and the wiring base member may be fixed between the first and second throttle bodies with the bolt that is inserted through the fastening hole and the insertion hole to fasten the gear cases together.

This allows the wiring base member placed between the two gear cases to be fixed between these gear cases using the bolts and fastening holes used for fastening the gear cases together. Thus, this eliminates screw holes at the gear cases, these screw holes being for fastening dedicated bolts that are used only to fix the wiring base member to the gear cases. This avoids a further increase in size of the throttle device.

(3) In this case, the insertion hole may include a tubular metal collar that is embedded or press-fitted into the wiring base member and has both ends that come in contact with the gear cases on both sides.

With this configuration, the metal collar receives the pressing force acting on the gear cases from the bolts that fasten the gear cases together. This suppresses cracking of the resin wiring base member.

(4) In this case, contacting faces of the metal collar and of the gear cases may have a positioning convex and a positioning concave, respectively, on both sides, and, fitting of each positioning convex and a corresponding positioning concave may determine the position of the wiring base member relative to the gear cases in a direction perpendicular to the extension direction of the throttle shaft.

This enables accurate positioning and assembly of the wiring base member to the gear cases. The metal collar, which avoids cracking of the wiring base member, also has a positioning function, and this eliminates positioning members other than the metal collar. This enables further downsizing of the throttle device and reduction in the weight and cost.

(5) In the present invention, each deceleration mechanism may include a valve gear fixed to the throttle shaft, a pinion gear located at the shaft end of the motor, and a deceleration gear having a large gear that meshes with the pinion gear and a small gear with fewer teeth than the large gear, the small gear meshing directly with the valve gear or meshing with the valve gear through another gear, in each of the throttle bodies, an outer side in the direction along the throttle shaft is defined as outward and an inner side is defined as inward, and the outward end faces of the pinion gear and the large gear may be located more inward than the outward end face of the valve gear.

With this configuration, the large gear of the deceleration gear and the pinion gear of each throttle body do not protrude beyond the valve gear in the direction toward the opposed and fixed throttle body.

With this configuration, these valve gears are placed closer to each other by the distance of a protrusion. This prevents the gap between the adjacent intake passages of the throttle bodies, which may have the deceleration mechanisms placed therebetween, from widening.

When both valve gears are placed close to each other, this configuration easily keeps the space between the pinion gears and large gears for placing the wiring base member.

DESCRIPTION OF THE PREFERRED EMBODIMENTS

Figure 1:
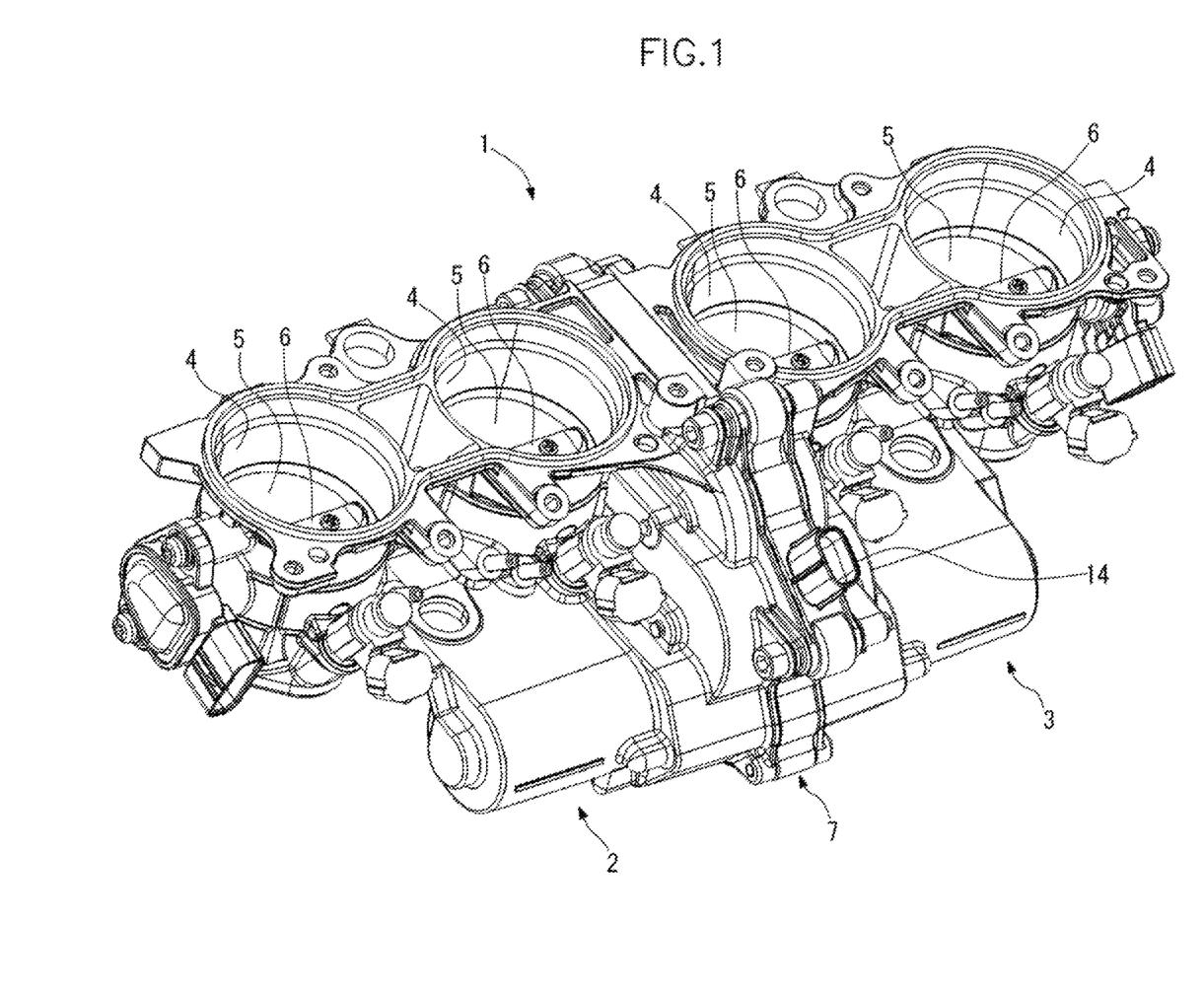
FIG. 1 is a perspective view of a throttle device according to one embodiment of the present invention.

The following describes one embodiment of the present invention, with reference to the drawings. FIG. 1 is a perspective view of a throttle device according to one embodiment of the present invention. As shown in FIG. 1, this throttle device 1 includes first and second throttle bodies 2 and 3 that are fixed to each other.

The first and second throttle bodies 2 and 3 each include a plurality of intake passages 4, a valve element 5 that opens and closes each of the intake passages 4, and a throttle shaft 6 that holds the valve element 5 and is rotatably supported by the first and second throttle bodies 2 and 3. A wiring base member 7 is fixed between the first and second throttle bodies 2 and 3.

Figure 2:
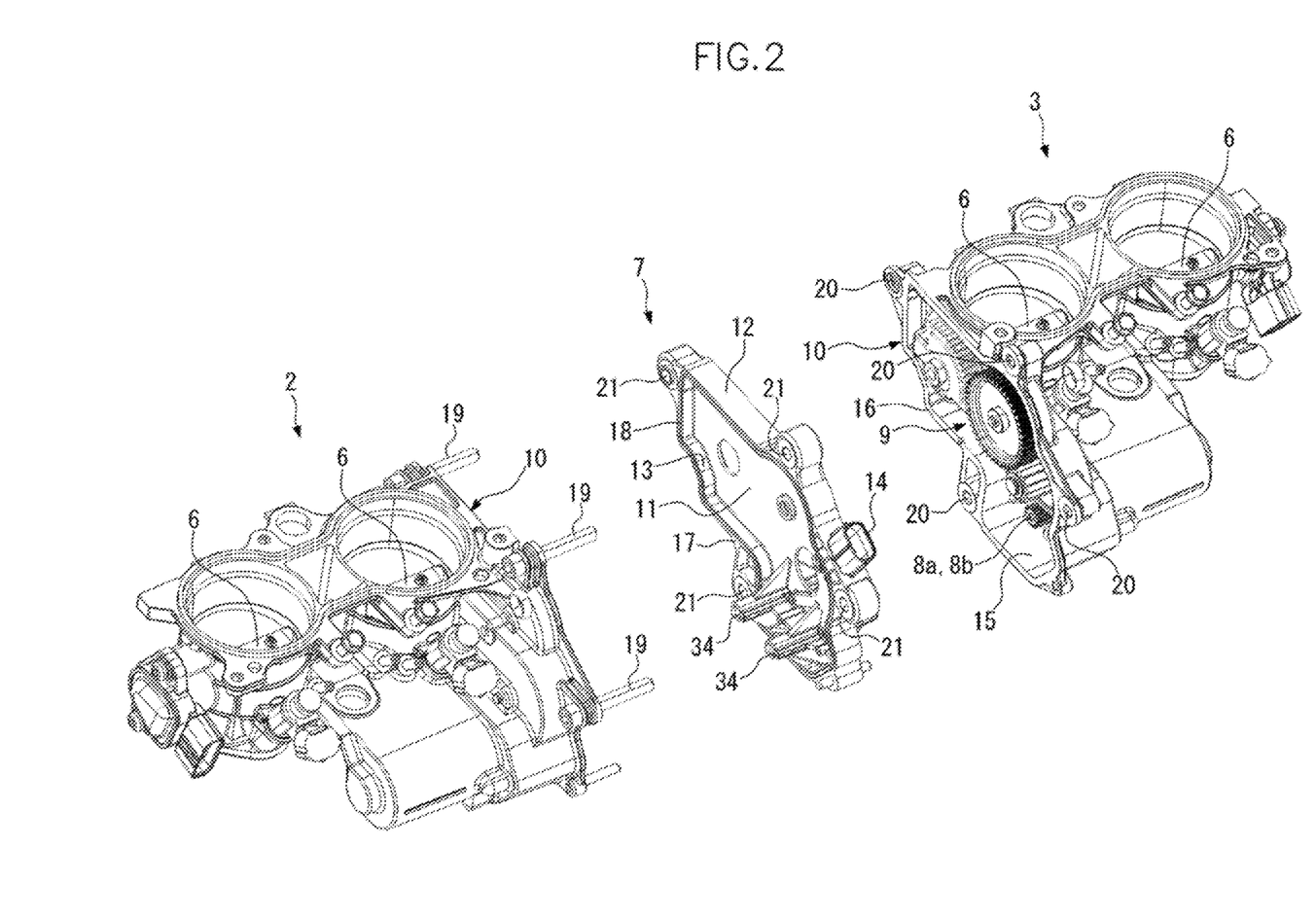
FIG. 2 is a perspective view of the throttle device in FIG. 1, where the first and second throttle bodies and the wiring base member are separated from each other.

FIG. 2 shows the throttle device 1, where the first and second throttle bodies 2, 3 and wiring base member 7 are separated from each other. As shown in FIG. 2, the first and second throttle bodies 2 and 3 each include: a motor 8 (see FIG. 5) with a drive shaft 8a parallel to the throttle shaft 6; a deceleration mechanism 9 that decelerates and transmits the rotational force of the shaft end 8b of the drive shaft 8a to the throttle shaft 6; and a gear case 10 that houses the deceleration mechanism 9 and is open at the shaft end 8b in the direction along the drive shaft 8a.

The wiring base member 7 is fixed between the first and second throttle bodies 2 and 3 while being placed between their gear cases 10. The wiring base member 7 has a double-sided cover face 11 that covers the opening sides of the gear cases 10, and an outer periphery 12 that constitutes the outer edge of the cover face 11. The outer periphery 12 constitutes side walls 13 rising from the bottom of the cover face 11 on both sides. The outer periphery 12 has a power coupler 14 that is connected to a power source that supplies power to the motors 8.

The gear cases 10 each have an end face 16 on the opening side of its side wall 15, and these end faces 16 hold an end face 17 of the outer periphery 12 of the wiring base member 7 therebetween. The space between the end face 16 of each gear case 10 and the end face 17 of the wiring base member 7 is sealed with an intervening seal member 18.

Each gear case 10 has four fastening holes 20 at appropriate positions on the outside of the side wall 15. Each fastening hole 20 receives an inserted bolt 19 for fastening the gear cases 10 together to fix the first and second throttle bodies 2 and 3 to each other. The fastening holes 20 of the second throttle body 3 each have an internal thread, into which the bolt 19 is screwed.

The wiring base member 7 has insertion holes 21 at positions corresponding to the fastening holes 20 on the outside of the outer periphery 12, and each insertion hole 21 receives the inserted bolt 19. The wiring base member 7 is fixed between the first and second throttle bodies 2 and 3 with the bolts 19 that are inserted through the fastening holes 20 and insertion holes 21 to fasten the gear cases 10 together.

Figure 3:
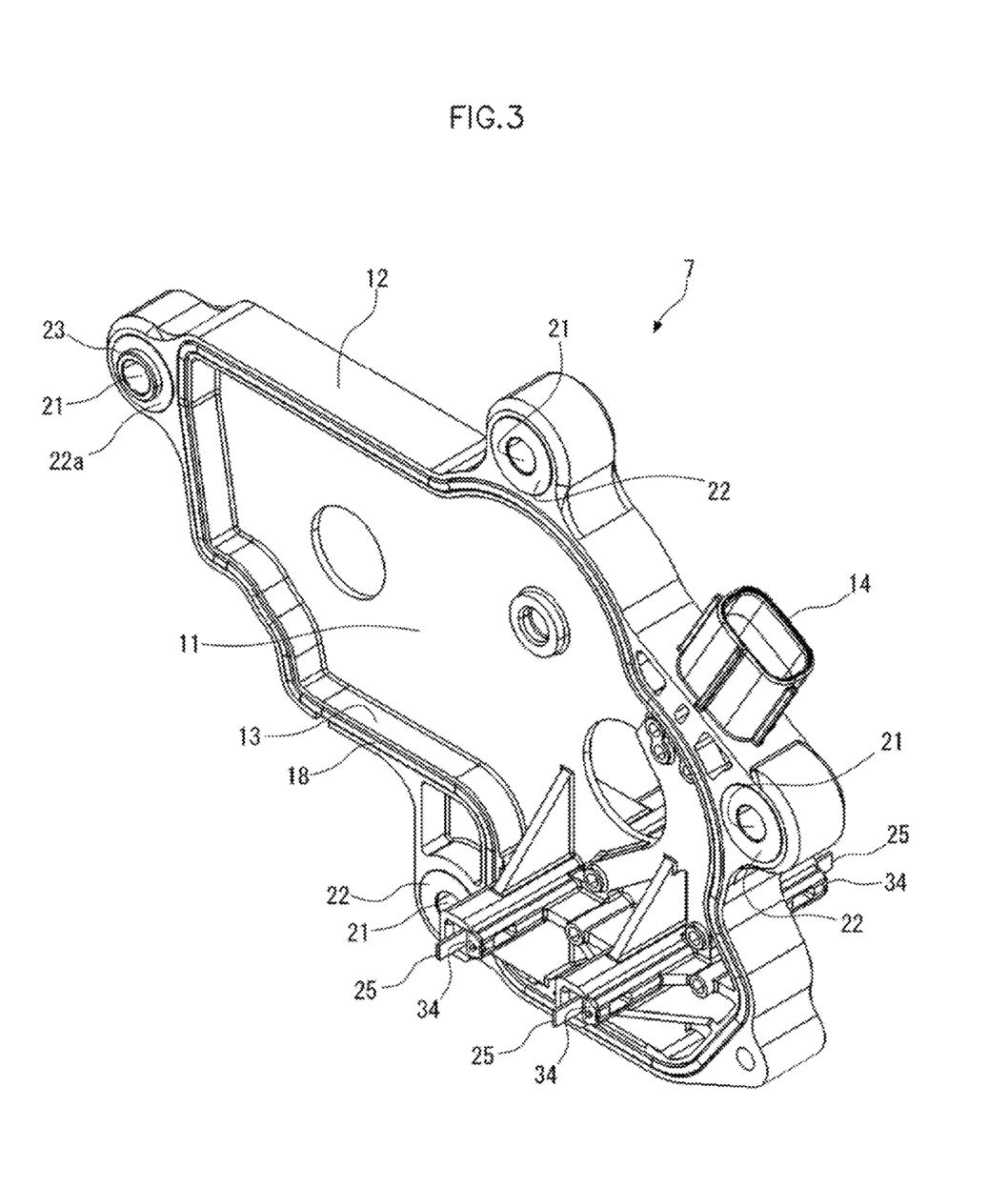
FIG. 3 is a perspective view of the wiring base member of the throttle device in FIG. 1.

FIG. 3 shows the wiring base member 7. As shown in FIG. 3, the insertion holes 21 include three tubular metal collars 22 and one metal collar 22a, which are embedded or press-fitted into the wiring base member 7 and have ends that come in contact with the gear cases 10 on both sides.

Figure 4:
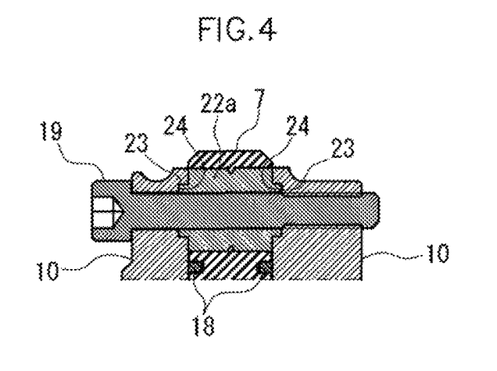
FIG. 4 is a cross-sectional view of one of the metal collars of the wiring base member in FIG. 3, and the portion of the gear case that comes into contact with the metal collar.

FIG. 4 is a cross-sectional view of the metal collar 22a and the portion of the gear case 10 that comes in contact with the metal collar 22a. As shown in FIG. 4, the contacting faces of this single metal collar 22a and of the gear case 10 have a positioning convex 23 and a positioning concave 24, respectively, on both sides. The fitting of the positioning convex 23 and positioning concave 24 determines the position of the wiring base member 7 relative to the gear cases 10 in a direction perpendicular to the extension direction of the throttle shaft 6.

Figure 5:
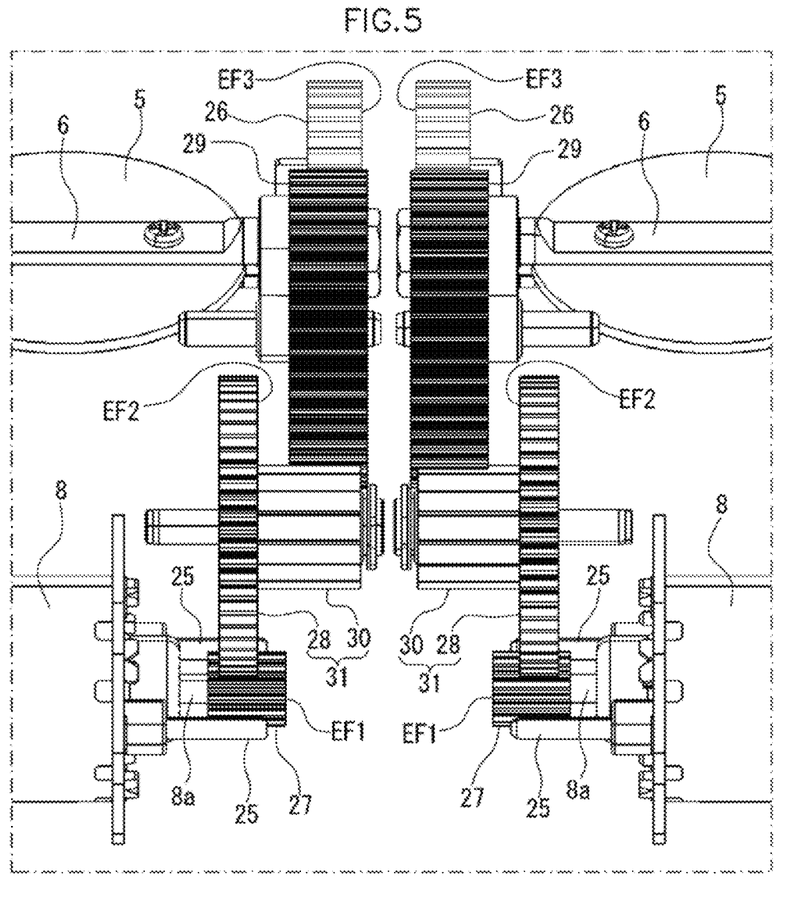
FIG. 5 is a front view of the deceleration mechanism of the throttle device in FIG. 1.
Figure 6:
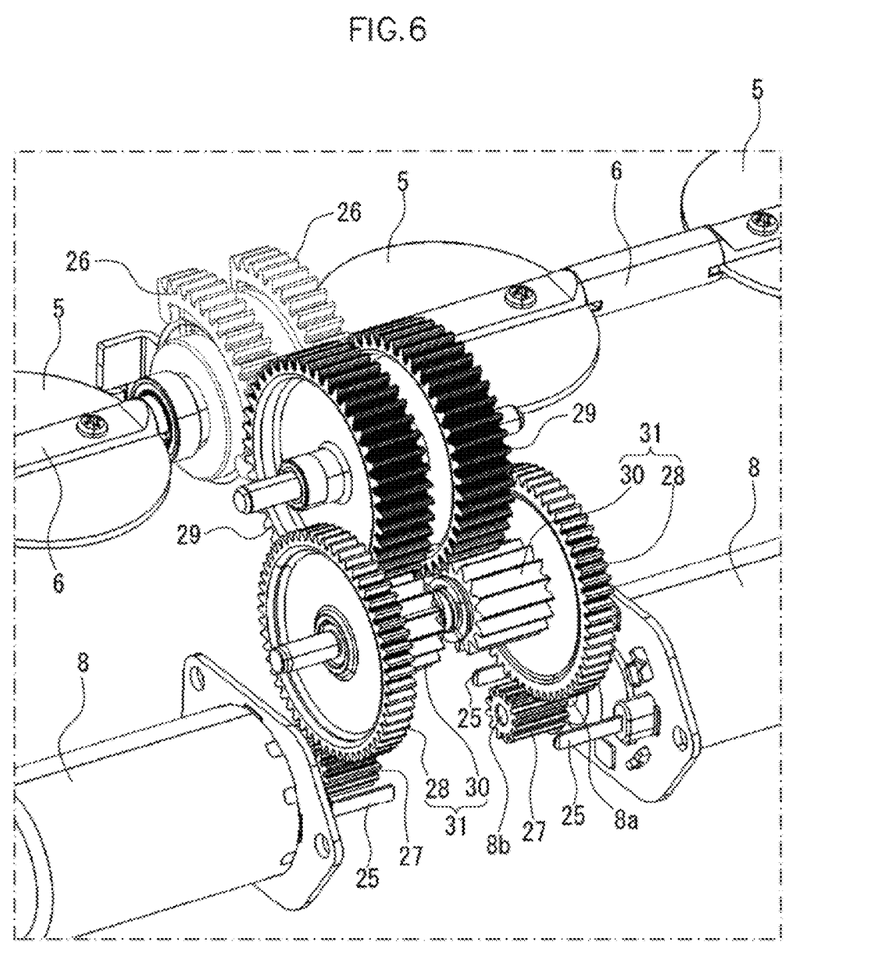
FIG. 6 is a perspective view of the deceleration mechanism in FIG. 5.

FIGS. 5 and 6 are a front view and a perspective view showing the deceleration mechanism 9 (see FIG. 2). As shown in FIGS. 5 and 6, the shaft ends 8b of the drive shafts 8a of the motors 8 face each other in the direction along the drive shafts 8a. Each motor 8 includes a motor terminal 25. In FIG. 1, which shows the first and second throttle bodies 2 and 3 and the wiring base member 7 that are assembled, the motor terminal 25 protrudes into the gear case 10 and is connected to the power coupler 14.

Each deceleration mechanism 9 includes a valve gear 26 fixed to the throttle shaft 6, a pinion gear 27 located at the shaft end of the motor 8, and a deceleration gear 31 having a large gear 28 that meshes with the pinion gear 27 and a small gear 30 with fewer teeth than the large gear 28, the small gear 30 meshing directly with the valve gear 26 or meshing with it through another gear 29.

In each of the first and second throttle bodies 2 and 3, the outer side in the direction along the throttle shaft 6 is defined as the outward and the inner side is defined as the inward. Then, as shown in FIG. 5, the outward end faces EF1 and EF2 of the pinion gear 27 and the large gear 28 are located more inward than the outward end face EF3 of the valve gear 26.

Figure 7:
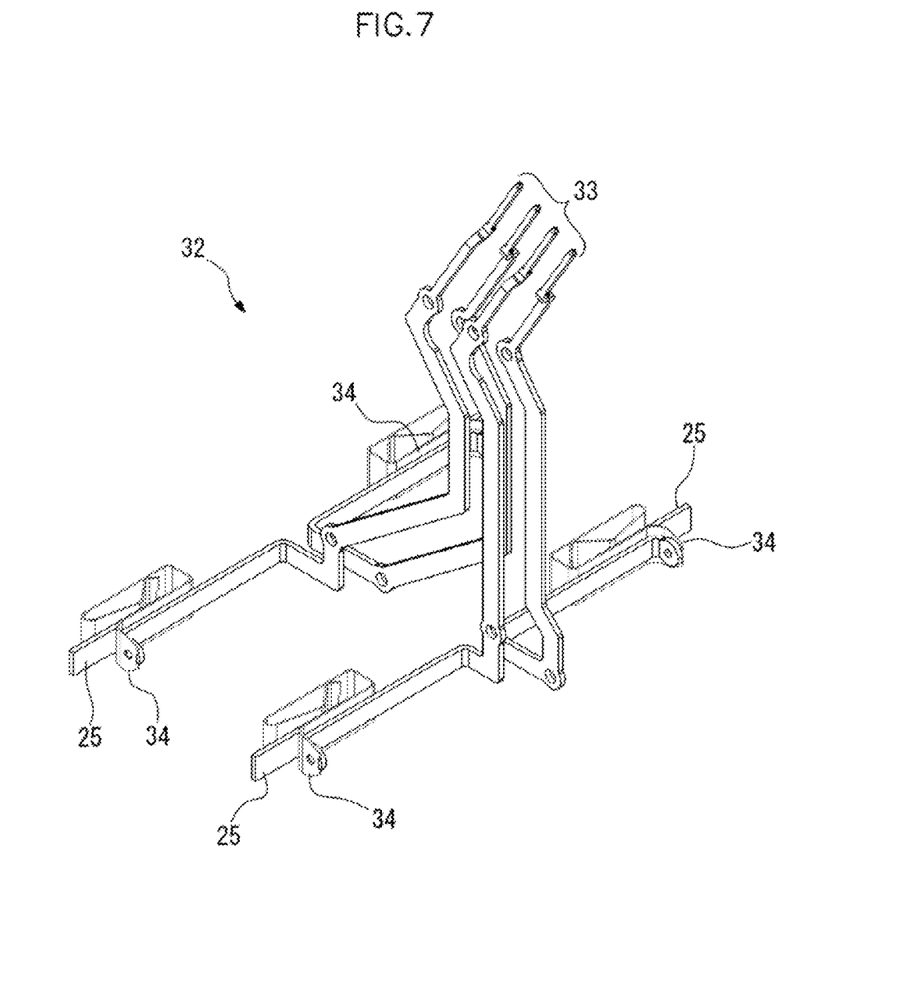
FIG. 7 shows wiring to be embedded in the wiring base member in FIG. 3 and connecting between the motor terminal of each motor and the power coupler.

FIG. 7 shows wiring 32 to be embedded in the wiring base member 7 and connecting between the motor terminal 25 of each motor 8 and the power coupler 14. The wiring 32 has, at both ends, a coupler-side terminal 33 that protrudes into the power coupler 14 to be connected to the power supply, and a motor-side terminal 34 that fits with the motor terminal 25 of the corresponding motor 8 to be connected to the motor terminal 25.

Figure 8:
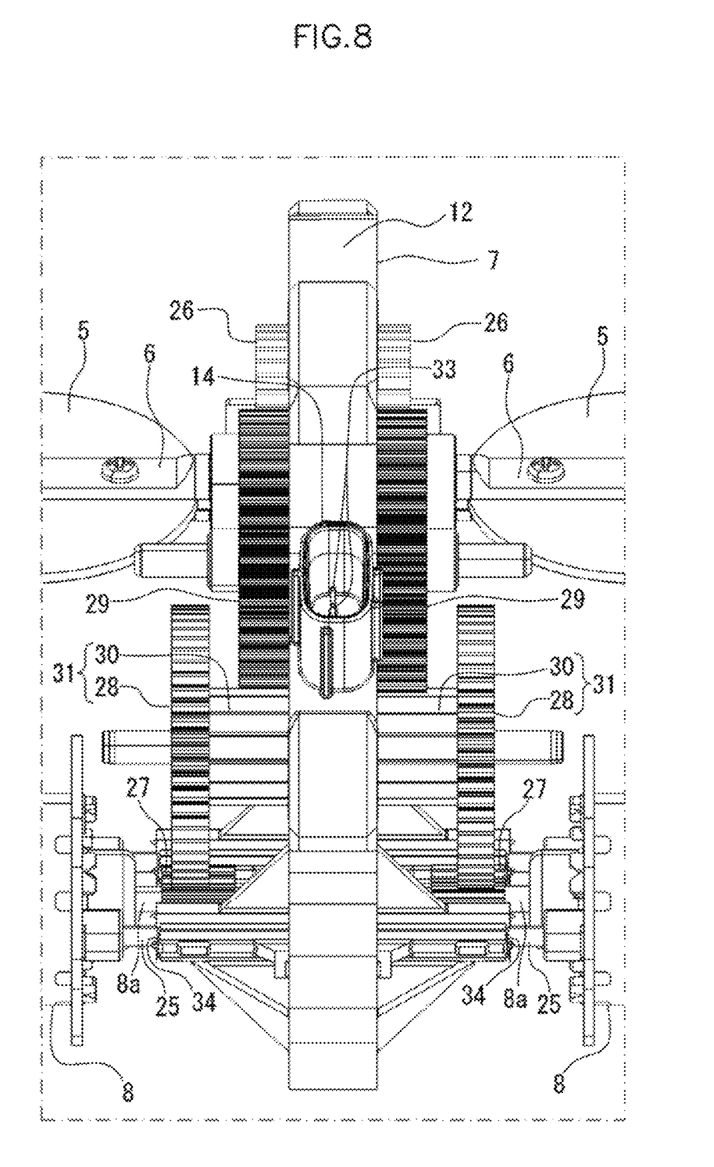
FIG. 8 is a front view showing the positional relationship between the deceleration mechanism in FIG. 6 and the wiring base member in FIG. 3.

FIG. 8 shows the positional relationship between the deceleration mechanism 9 and the wiring base member 7. As shown in FIG. 8, the motor terminal 25 of each motor 8 fits with the motor-side terminal 34 (see FIGS. 2 and 7) of the wiring 32 embedded in the wiring base member 7, so that the motor 8 is connected to the coupler-side terminal 33 protruding into the power coupler 14.

With this configuration, the first and second throttle bodies 2 and 3 are fixed to each other by fitting the motor terminal 25 of each motor 8 with the corresponding motor-side terminal 34 while holding the end face 17 of the wiring base member 7 between the end faces 16 of the gear cases 10. At this time, the seal member 18 is interposed between the end faces 16 and the end face 17.

This allows each metal collar 22, 22a of the wiring base member 7 and the gear cases 10 on both sides to come in contact with each other, and allows the positioning convex 23 and positioning concave 24 of the single metal collar 22a and each gear case 10 to fit with each other. This fitting determines the position of the wiring base member 7 relative to the gear cases 10 in a direction perpendicular to the extension direction of the throttle shaft 6.

Along with this, a bolt 19 is inserted into each fastening hole 20 of the gear case 10 of the first throttle body 2, is passed through the corresponding insertion hole 21 of the wiring base member 7, and then is screwed with the internal thread of the corresponding fastening hole 20 of the gear case 10 of the second throttle body 3, thereby fastening the gear case 10 of the first throttle body 2 to the gear case 10 of the second throttle body 3.

This fastening brings the wiring base member 7 and the gear cases 10 on both sides into contact with each other, and gives a pressing force from the valve gears 26 to the wiring base member 7. This pressing force is received by the end faces of the metal collars 22 and 22a of the wiring base member 7, which avoids cracking of the resin wiring base member 7 due to the pressing pressure.

The gear cases 10 are fastened in this manner, meaning the completion of the assembly of the throttle device 1 where the first and second throttle bodies 2 and 3 are secured to each other with the wiring base member 7 placed between their gear cases 10 and with the electrical connection between each motor 8 and the power coupler 14 established.

As explained above, this embodiment reduces or eliminates dedicated fixing members such as bolts, which are used only to fix two wiring base members to the first and second throttle bodies 2 and 3. Thus, the throttle device 1 can be downsized, and its weight and cost can be reduced.

The wiring base member 7 is fixed between the first and second throttle bodies 2 and 3 with the bolts 19 that are inserted through the fastening holes 20 of the gear cases 10 and the insertion holes 21 of the wiring base member 7. This eliminates screw holes at the gear cases 10, these screw holes being for fastening dedicated bolts that are used only to fix the wiring base member 7 to the gear cases 10. This avoids an increase in size of the throttle device 1.

The insertion holes 21 of the wiring base member 7 include tubular metal collars 22 and 22a that are embedded or press-fitted in the wiring base member 7 and have both ends that come in contact with the gear cases 10 on both sides. With this configuration, the metal collars 22 and 22a receive the pressing force acting on the gear cases 10 from the bolts 19 that fasten the gear cases 10 together. This suppresses cracking of the resin wiring base member 7.

The metal collar 22a and gear cases 10 have the positioning convexes 23 and positioning concaves 24, and the fitting of these convexes and concaves determines the position of the wiring base member 7 relative to the gear cases 10 in a direction perpendicular to the extension direction of the throttle shaft 6, which enables accurate positioning and assembly of the wiring base member 7 to the gear cases 10.

The metal collar 22a of the wiring base member 7 also has a positioning function, which eliminates positioning members other than the metal collar 22a. This enables further downsizing of the throttle device 1 and reduction in the weight and cost.

The large gear 28 and pinion gear 27 of each of the first and second throttle bodies 2 and 3 do not protrude beyond the valve gear 26 in the direction toward the second and first throttle bodies 3 and 2 on the other side. Accordingly, these valve gears 26 are placed closer to each other.

This prevents the gap between the intake passages 4 near the deceleration mechanism 9 of the first and second throttle bodies 2 and 3 from widening. With this configuration, both valve gears 26 may be placed close to each other while easily keeping the space between the pinion gears 27 and large gears 28 for placing the wiring base member 7.

The present invention is not limited to the above-stated embodiment, and may be modified as needed. For instance, the number of intake passages 4 in each of the first and second throttle bodies 2 and 3 is not limited to two, but may be one or three or more.

REFERENCE SIGNS LIST

1 . . . . Throttle device, 2 . . . . First throttle body, 3 . . . . Second throttle body, 4 . . . . Intake passage, 5 . . . . Valve element, 6 . . . . Throttle shaft, 7 . . . . Wiring base member, 8 . . . . Motor, 8a . . . . Drive shaft, 8b . . . . Shaft end, 9 . . . . Deceleration mechanism, 10 . . . . Gear case, 11 . . . . Cover face, 12 . . . . Outer periphery, 13 . . . . Side wall, 14 . . . . Power coupler, 15 . . . . Side wall, 16 . . . . End face, 17 . . . . End face, 18 . . . . Seal member, 19 . . . . Bolt, 20 . . . . Fastening hole, 21 . . . . Insertion hole, 22, 22a . . . . Metal collar, 23 . . . . Positioning convex, 24 . . . . Positioning concave, 25 . . . . Motor terminal, 26 . . . . Valve gear, 27 . . . . Pinion gear, 28 . . . . Large gear, 29 . . . . Another gear, 30 . . . . Small gear, 31 . . . . Deceleration gear, 32 . . . . Wiring, 33 . . . . Coupler-side terminal, 34 . . . . Motor-side terminal, EF1, EF2, EF3 . . . . End face

What is claimed is:

1. A throttle device comprising first and second throttle bodies that are fixed to each other,
   each throttle body including an intake passage, a valve element that opens and closes the intake passage, a throttle shaft that holds the valve element and is rotatably supported by the throttle body, a motor having a drive shaft substantially parallel to the throttle shaft, a deceleration mechanism that decelerates and transmits a rotational force of the drive shaft at a shaft end to the throttle shaft, and a gear case that houses the deceleration mechanism, each gear case being open at the shaft end side in a direction along the drive shaft so that the shaft ends of the drive shafts face each other, the throttle device further comprising: a wiring base member that has a double-sided cover face that covers opening sides of each of the gear cases; and an outer periphery that constitutes an outer edge of the cover face, the wiring base member being disposed between the gear cases to be fixed between the first and second throttle bodies, the wiring base member having a power coupler on the outer periphery, each motor including a motor terminal protruding into the corresponding gear case, the wiring base member having wiring embedded therein, the wiring connecting the motor terminal of each motor and the power coupler.

2. The throttle device according to claim 1, wherein each gear case has a fastening hole that receives an inserted bolt that fastens the gear cases together, the wiring base member has an insertion hole that receives the inserted bolt, and the wiring base member is fixed between the first and second throttle bodies with the bolt that is inserted through the fastening hole and the insertion hole to fasten the gear cases together.

3. The throttle device according to claim 2, wherein the insertion hole being configured by a tubular metal collar that is embedded or press-fitted into the wiring base member and has both ends that come in contact with the gear cases on both sides.

4. The throttle device according to claim 3, wherein contacting faces of the metal collar and of each gear case have a positioning convex and a positioning concave, respectively, on both sides, and, fitting of each positioning convex and a corresponding positioning concave determines a position of the wiring base member relative to the gear cases in a direction perpendicular to an extension direction of the throttle shaft.

5. The throttle device according to claim 1, wherein each deceleration mechanism includes a valve gear fixed to the throttle shaft, a pinion gear located at the shaft end of the motor, and a deceleration gear having a large gear that meshes with the pinion gear and a small gear with fewer teeth than the large gear, the small gear meshing directly with the valve gear or meshing with the valve gear through another gear, in each of the throttle bodies, an outer side in a direction along the throttle shaft is defined as outward and an inner side is defined as inward, and an outward end faces of the pinion gear and the large gear are located more inward than the outward end face of the valve gear.

* * * * *